(12) United States Patent
Mak et al.

(10) Patent No.: US 8,698,492 B1
(45) Date of Patent: Apr. 15, 2014

(54) METHODS FOR TESTING FOR DEFECTS ON MAGNETIC MEDIA STORAGE DISKS

(75) Inventors: Chee Wai Mak, Lamlukka (TH); Surasith Phongtharapat, Thunyaburi (TH); Chalermchai Suchatpong, Thanyaburi (TH)

(73) Assignee: Western Digital Technologies, Inc., Irvine, CA (US)

(*) Notice: Subject to any disclaimer, the term of this patent is extended or adjusted under 35 U.S.C. 154(b) by 256 days.

(21) Appl. No.: 13/348,010

(22) Filed: Jan. 11, 2012

(51) Int. Cl.
*G01N 27/84* (2006.01)
*G01N 27/72* (2006.01)

(52) U.S. Cl.
USPC ............................................ 324/216; 324/227

(58) Field of Classification Search
USPC .................................................. 324/216, 227
See application file for complete search history.

(56) References Cited

U.S. PATENT DOCUMENTS

| | | | |
|---|---|---|---|
| 6,223,303 B1 | 4/2001 | Billings et al. | |
| 6,281,676 B1 | 8/2001 | Ottesen et al. | |
| 6,862,150 B1 | 3/2005 | Eto | |
| 6,876,445 B2 | 4/2005 | Shibuya et al. | |
| 6,985,319 B2 | 1/2006 | Yip et al. | |
| 7,072,129 B1 | 7/2006 | Cullen et al. | |
| 7,139,145 B1 | 11/2006 | Archibald et al. | |
| 7,206,150 B2 | 4/2007 | Koshkina et al. | |
| 8,014,094 B1* | 9/2011 | Jin .................................. | 360/31 |
| 2001/0055172 A1 | 12/2001 | Yip et al. | |
| 2002/0181133 A1 | 12/2002 | Koshkina et al. | |
| 2002/0191319 A1 | 12/2002 | Liew et al. | |
| 2006/0056088 A1 | 3/2006 | Kudoh et al. | |
| 2007/0146921 A1 | 6/2007 | Jun | |
| 2010/0269023 A1 | 10/2010 | Yang et al. | |

OTHER PUBLICATIONS

Kittiphan Pomoung, et al., Rank-Level Fusion with Neural Network in Classification of Media Defect Patterns, College of Data Storage Technology and Applications and Faculty of Engineering, King Mongkut's Institute of Technology Ladkrabang, DST-CON 2010, p. 9-12.

* cited by examiner

*Primary Examiner* — Bot Ledynh

(57) ABSTRACT

Methods for testing for defects on magnetic media storage disks are provided. One such method includes dividing a surface of a magnetic media disk into a plurality of radial zones, dividing the disk surface into a plurality of concentric zones, thereby forming a preselected number (N) of wedge subsections for each of the concentric zones, scanning the disk surface for defects, counting the defects contained within each of the wedge subsections, summing the defects contained within two or more of the wedge subsections, comparing the summed defects with a preselected threshold, and determining, based on the comparison, a defect type of the disk.

13 Claims, 6 Drawing Sheets

METHODS FOR TESTING FOR DEFECTS ON MAGNETIC MEDIA STORAGE DISKS

FIELD

The present invention relates generally to processes for testing media disks, and more specifically, to methods for testing for defects on magnetic media storage disks.

BACKGROUND

In the manufacture and assembly of magnetic media storage disks for storage drives (e.g., hard drives), a number of disk defects are commonly found. These defects may require debugging that can be both time consuming and expensive to perform. A failed disk of this sort will often have to be removed from a failed drive and subjected to media certification or testing to determine if the magnetic disk is usable or not. The media certification determines the number of defect counts in a given washer shaped area of the disk. If the number exceeds a predetermined threshold, then the magnetic disk is put aside for further processing. If the number falls below the predetermined threshold, then the magnetic disk is recycled into the hard disk drive manufacturing process.

A media test tool such as the MC900 (media certifier 900 series) can be used to perform the media certification. However, a known short-coming of this tool and other such tools in the industry is the ability to detect spiral/circular scratches and light micro scratches. As such, an alternative method for detecting and screening out such defects is needed.

Pattern recognition is an established science that is sometimes applied to detecting defects on media. Pattern recognition employs complex mathematical modeling to perform feature extraction, feature recognition and then assimilation of the results for final classification. While aspects of pattern recognition are relatively well established, it is believed that such techniques have not been successfully applied to address the detection of a number of defect types including both light micro scratches and spiral/circular scratches.

SUMMARY

Aspects of the invention relate to methods for testing for defects on magnetic media storage disks. In one embodiment, the invention relates to a method for testing for defects in magnetic media storage disks, the method including dividing a surface of a magnetic media disk into a plurality of radial zones, dividing the disk surface into a plurality of concentric zones, thereby forming a preselected number (N) of wedge subsections for each of the concentric zones, scanning the disk surface for defects, counting the defects contained within each of the wedge subsections, summing the defects contained within two or more of the wedge subsections, comparing the summed defects with a preselected threshold, and determining, based on the comparison, a defect type of the disk.

DETAILED DESCRIPTION

The characterization of defects in magnetic media can be important and fairly application specific. With this in mind a discussion of a number of preselected ways for characterizing defects is believed to be helpful.

Figures 8A, 8B:
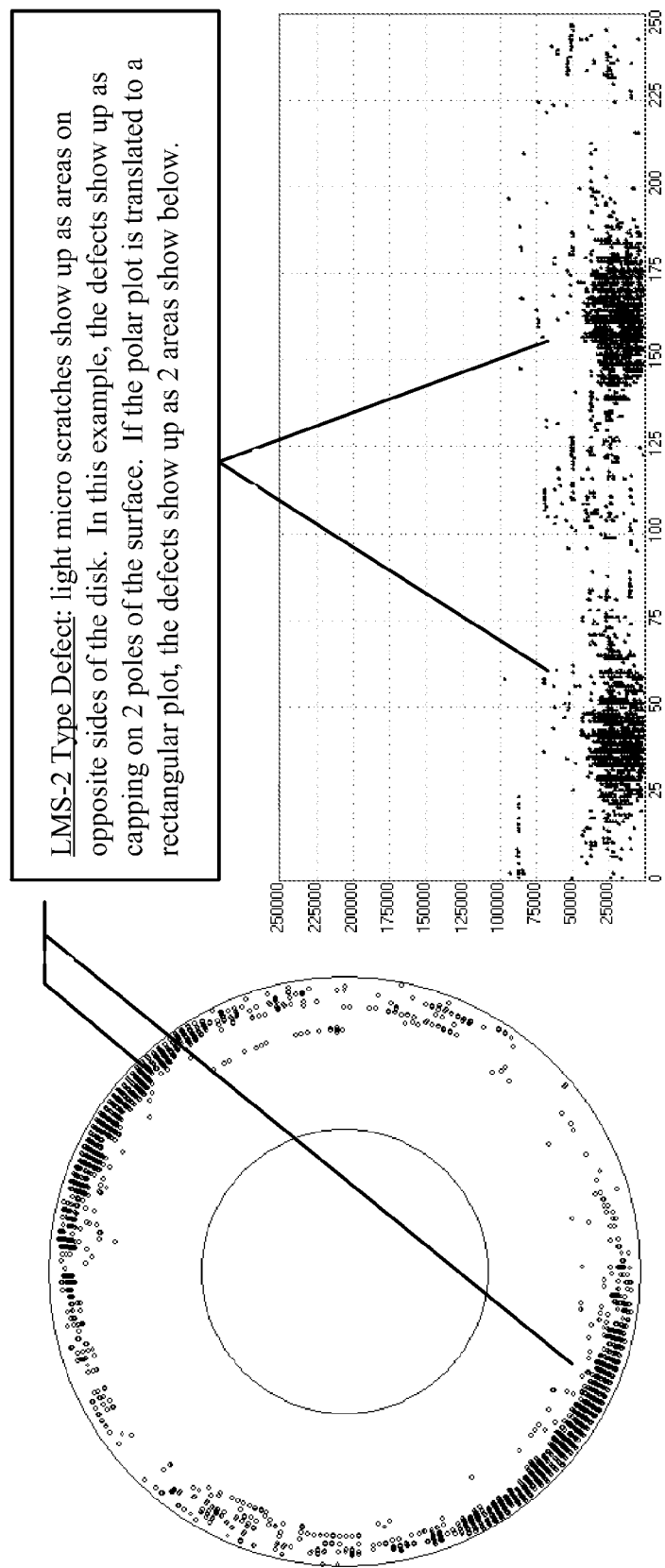
FIG. 8a is a polar plot of light micro scratches on a media disk having the scratches roughly concentrated on opposite sides of the disk thereby illustrating two pole or LMS-2 type defects in accordance with one embodiment of the invention.
FIG. 8b is a rectangular plot of the light micro scratches on the media disk of FIG. 8a illustrating the two pole or LMS-2 type defects in accordance with one embodiment of the invention.

FIG. 8a is a polar plot of light micro scratches on a media disk having the scratches roughly concentrated on opposite sides of the disk thereby illustrating two pole or LMS-2 type defects in accordance with one embodiment of the invention. If the polar plot is extrapolated to a rectangular plot, the defects are illustrated as being in two relatively distinct groups. FIG. 8b is a rectangular plot of the light micro scratches on the media disk of FIG. 8a illustrating the two pole or LMS-2 type defects in accordance with one embodiment of the invention.

Figures 9A, 9B:
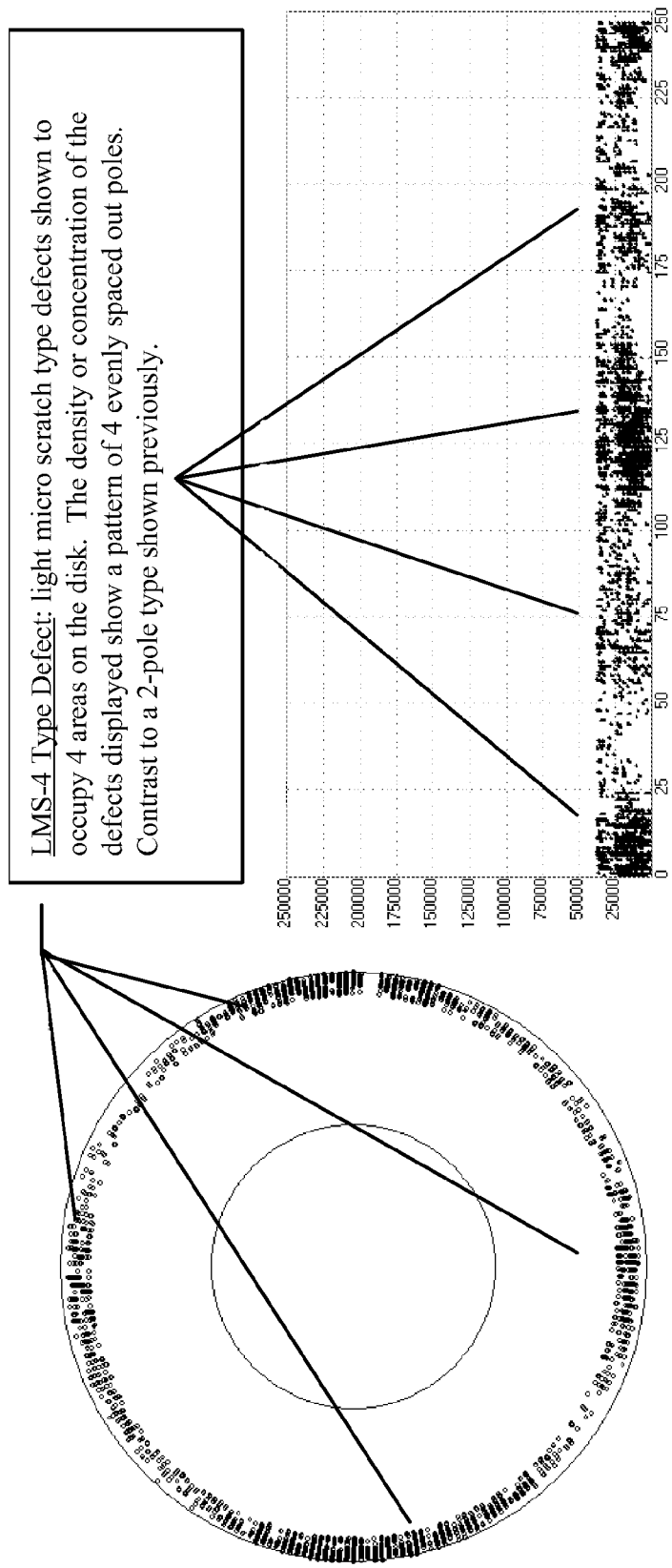
FIG. 9a is a polar plot of light micro scratches on a media disk having the scratches roughly concentrated on four areas of the disk thereby illustrating four pole or LMS-4 type defects in accordance with one embodiment of the invention.
FIG. 9b is a rectangular plot of the light micro scratches on the media disk of FIG. 9a illustrating the four pole or LMS-4 type defects in accordance with one embodiment of the invention.

FIG. 9a is a polar plot of light micro scratches on a media disk having the scratches roughly concentrated on four areas of the disk thereby illustrating four pole or LMS-4 type defects in accordance with one embodiment of the invention. The density or concentration of the defects displayed on the disk illustrate the pattern of four poles that are roughly evenly spaced apart. FIG. 9b is a rectangular plot of the light micro scratches on the media disk of FIG. 9a illustrating the four pole or LMS-4 type defects in accordance with one embodiment of the invention.

As can be extrapolated from FIGS. 8a-9b, it is also possible to have defects concentrated in other than two or four groups. In one embodiment, for example, the light micro scratches are concentrated in roughly six distinct groups to form a six pole or LMS-6 type defect. In addition, defects can fall into other categories such as a non-uniform classification. Defects such as spiral or circular scratches can also be found in conjunction with the defects already discussed.

Referring now to FIGS. 1-7, embodiments of processes for testing for preselected defects in magnetic media storage disks are illustrated. The processes divide the surface of a magnetic media disk into radial zones and divide the disk surface into concentric zones, thereby forming a preselected number (N) of wedge subsections for each of the concentric zones. The processes then scan the disk surface for defects while counting the defects contained within each wedge subsection. The processes sum the defects contained within two or more of the wedge subsections and compare the summed defects with preselected thresholds. The processes then determine, based on the comparisons, a defect type of the disk. The types of defects can include no defect, a LMS-2 type defect, a LMS-4 type defect, a LMS-6 type defect, a marking/non-uniform type defect, a spiral/circular scratch type defect, and/or combinations of these defect types. Based on the classification of the defect, the defective disks can be identified quickly and reworked efficiently to address the specific defect.

Figure 1:
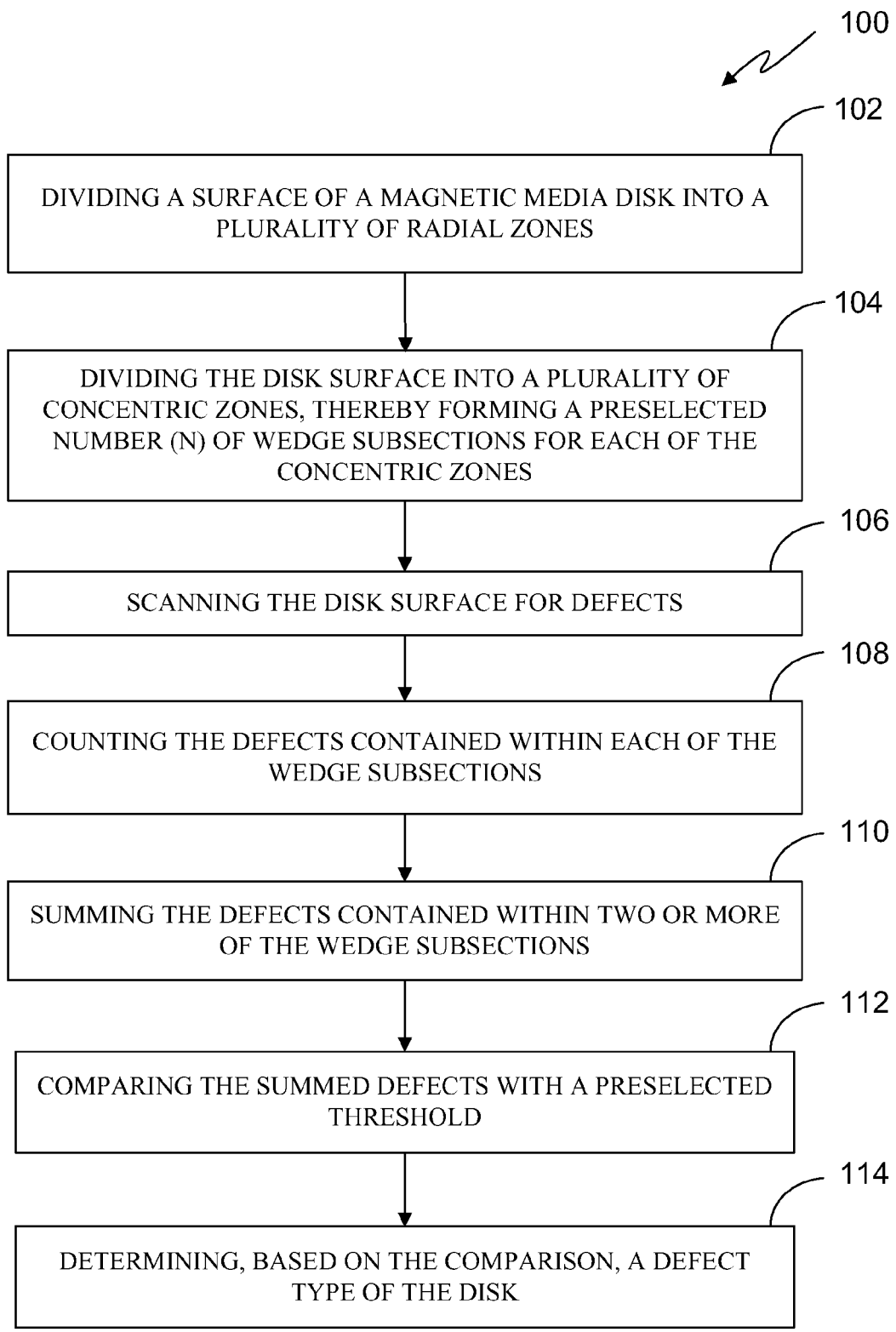
FIG. 1 is a flowchart of a process for testing for preselected defects in magnetic media storage disks in accordance with one embodiment of the invention.

FIG. 1 is a flowchart of a process 100 for testing for preselected defects in magnetic media storage disks in accordance with one embodiment of the invention. The process first divides (102) a surface of a magnetic media disk into a plurality of radial zones. In several embodiments, the radial zones are created by applying one or more diameter lines (e.g., lines extending from one perimeter point of the disk through the center and to another perimeter point of the disk) to a surface of the disk. In several such embodiments, the radial zones are about equal in size. In one embodiment, five diameter lines are applied thereby creating ten radial zones. The process then divides (104) the disk surface into a plurality of concentric zones, thereby forming a preselected number (N) of wedge subsections for each of the concentric zones. In some embodiments, the process can divide the disk surface into the concentric zones before dividing the disk surface into radial zones. In one embodiment, the process divides the disk surface into three concentric zones and ten radial zones, thereby forming 30 wedge subsections.

The process then scans (106) the disk surface for defects. In one embodiment, the process performs one or more tone scans and/or other suitable scans known in the art. The process counts (108) the defects contained within each of the wedge subsections. The process then sums (110) the defects contained within two or more of the wedge subsections. In several embodiments, the wedge subsections that are summed vary in accordance with the type of defect to be detected. The process compares (112) the summed defects with one or more preselected thresholds. In a number of embodiments, the preselected thresholds are determined based on the results of empirical testing. The process then determines (114), based on the comparison, a defect type of the disk. In some cases there may be no defect. In other cases, the defect types can include a LMS-2 type defect, a LMS-4 type defect, a LMS-6 type defect, a marking/non-uniform type defect, a spiral/circular scratch type defect, and/or combinations of these or other known defect types. Based on the classification of the defect, the defective disks can be identified quickly and reworked efficiently to address the specific defect.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 2:
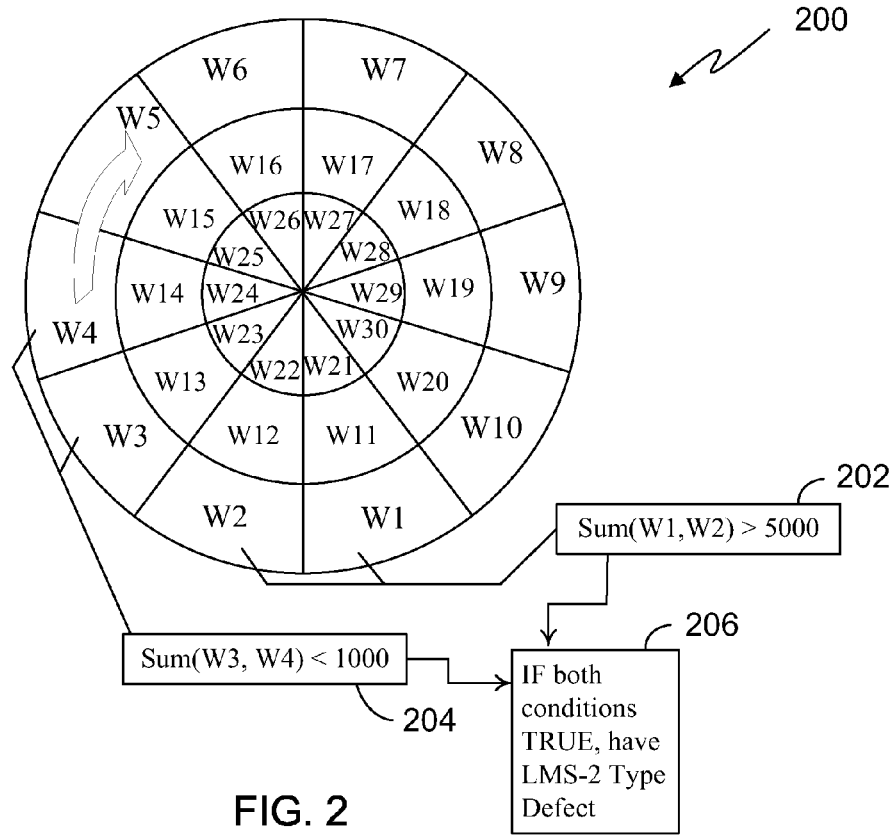
FIG. 2 is a top schematic view of a media disk divided into wedge subsections and an algorithm for determining whether type two light micro scratch (LMS-2) defects exist in the first four wedge subsections of the media disk in accordance with one embodiment of the invention.

FIG. 2 is a top schematic view of a media disk 200 divided into wedge subsections (W1-W30) and an algorithm (202-206) for determining whether type two light micro scratch (LMS-2) defects exist in the first four wedge subsections (W1-W4) of the media disk in accordance with one embodiment of the invention. As can be seen in FIG. 2, the disk surface has been divided into three concentric zones and ten radial zones, thereby forming the 30 wedge subsections (W1-W30). In other embodiments, the disk surface can be divided into more than or less than three concentric zones, and more than or less than ten radial zones. In several embodiments, the disk surface includes a number of media tracks. In one such embodiment, the inner concentric zone includes about 30 percent of the media tracks, the middle concentric zone includes about 50 percent of the media tracks, and the outer concentric zone includes about 20 percent of the media tracks. In other embodiments, the zones can be arranged to provide for other suitable percentages of the media tracks.

The algorithm first sums (202) the defects found in the first two wedge sections (W1, W2) and determines whether the sum is greater than 5,000. The algorithm then sums (204) the defects found in the second two wedge sections (W3, W4) and determines whether the sum is less than 1,000. The algorithm then determines (206) whether both such conditions are true, and, if so, stores information indicative of a LMS-2 type defect having been found on the disk. In the algorithm, preselected defect thresholds of 1,000 and 5,000 are used. In other embodiments, other suitable thresholds can be used.

Figure 3:
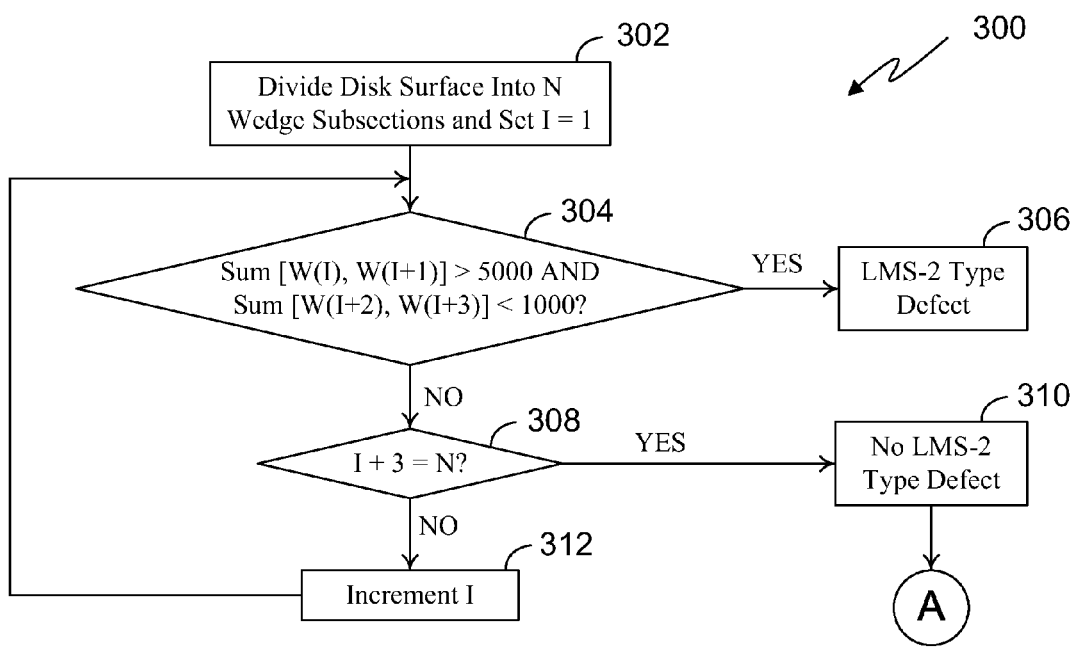
FIG. 3 is a flowchart of a process for determining whether type two light micro scratch (LMS-2) defects exist on a media disk in accordance with one embodiment of the invention.

FIG. 3 is a flowchart of a process 300 for determining whether type two light micro scratch (LMS-2) defects exist on a media disk in accordance with one embodiment of the invention. In particular embodiments, process 300 can be used with the media disk of FIG. 2 and/or in conjunction with the process of FIG. 1. The process 300 first divides (302) the disk surface into N wedge subsections and sets an index variable I to be equal to 1. In some embodiments, the disk surface may be divided in accordance with steps 102 and 104 of the process 100 of FIG. 1. In one embodiment, N is 30.

The process then determines (304) whether the expression "Sum[W(I), W(I+1)]>5,000 AND Sum[W(I+2), W(I+3)] <1000" is true. The former being a comparison of the sum of defects for wedge subsections W(I) and W(I+1) and a first preselected defect threshold of 5,000. The latter being a comparison of the sum of defects for wedge subsections W(I+2) and W(I+3) and a second preselected defect threshold of 1,000. If the expression is true, then the process has detected (306) a LMS-2 type defect. If the expression is false, then the process determines (308) whether all of the wedge subsections have been counted by examining the expression "I+3=N". If all of the wedge subsections have been counted, then the process notes (310) that no LMS-2 type defects were found. If all of the wedge subsections have not been counted, the process increments (312) the index variable I and returns to determining (304) the sum expression for the next group of wedge subsections.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
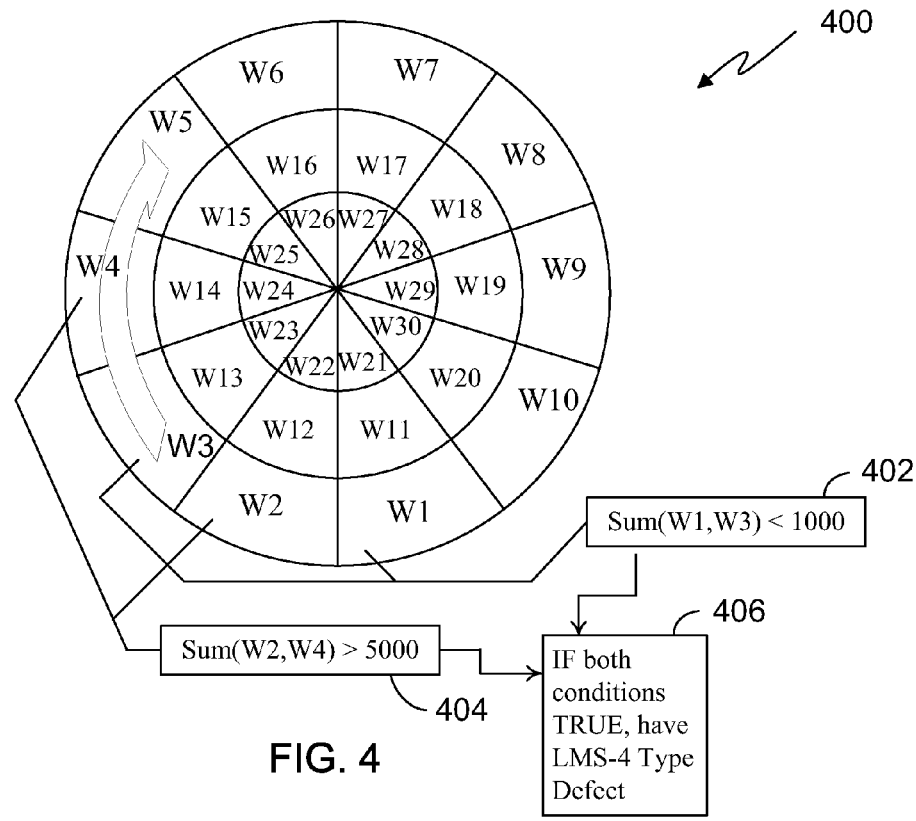
FIG. 4 is a top schematic view of a media disk divided into wedge subsections and an algorithm for determining whether type four light micro scratch (LMS-4) defects exist in the first four wedge subsections of the media disk in accordance with one embodiment of the invention.

FIG. 4 is a top schematic view of a media disk 400 divided into wedge subsections (W1-W30) and an algorithm (402-406) for determining whether type four light micro scratch (LMS-4) defects exist in the first four wedge subsections (W1-W4) of the media disk in accordance with one embodiment of the invention. As can be seen in FIG. 4, the disk surface has been divided into three concentric zones and ten radial zones, thereby forming the 30 wedge subsections (W1-W30). In other embodiments, the disk surface can be divided into more than or less than three concentric zones, and more than or less than ten radial zones. The algorithm first sums (402) the defects found in the first two odd wedge subsections (W1, W3) and determines whether the sum is less than 1,000. The algorithm then sums (404) the defects found in the first two even wedge subsections (W2, W4) and determines whether the sum is greater than 5,000. The algorithm then determines (406) whether both such conditions are true, and, if so, stores information indicative of a LMS-4 type defect having been found on the disk. In the algorithm, preselected defect thresholds of 1,000 and 5,000 are used. In other embodiments, other suitable thresholds can be used.

Figure 5:
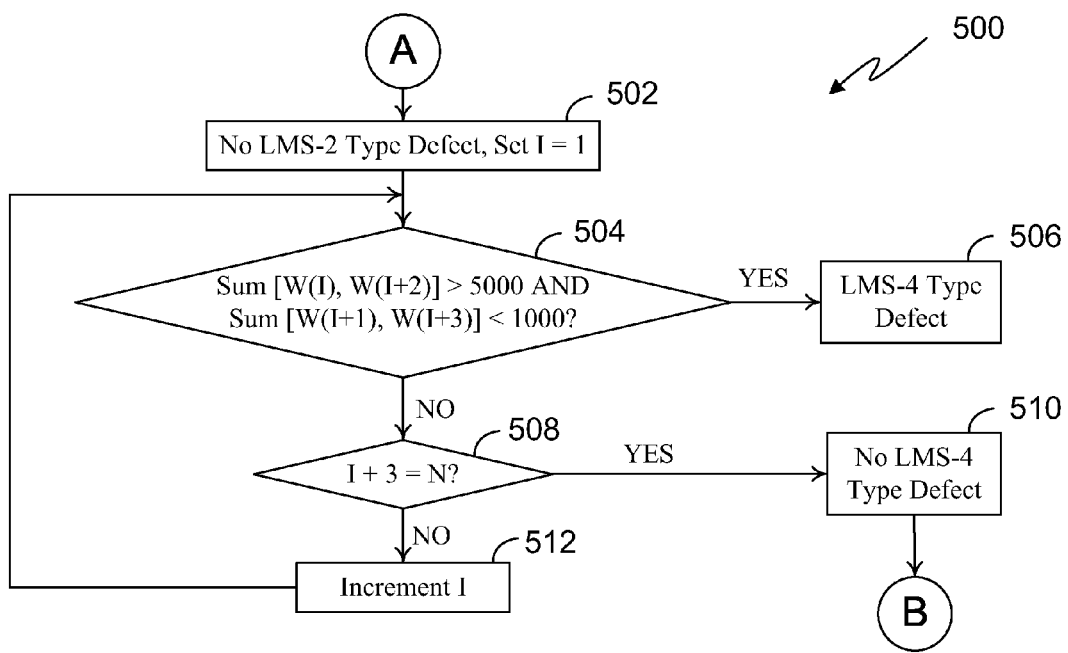
FIG. 5 is a flowchart of a process for determining whether type four light micro scratch (LMS-4) defects exist on a media disk in accordance with one embodiment of the invention.

FIG. 5 is a flowchart of a process 500 for determining whether type four light micro scratch (LMS-4) defects exist on a media disk in accordance with one embodiment of the invention. In particular embodiments, process 500 can be used in conjunction with the media disk of FIG. 4 and/or the processes of FIGS. 1 and 3. Process 500 continues from block 310 of process 300 where it was determined that no LMS-2 type defects were found and sets an index variable I to be equal to 1 in block 502.

The process then determines (504) whether the expression "Sum[W(I), W(I+2)]>5,000 AND Sum[W(I+1), W(I+3)] <1000" is true. The former being a comparison of the sum of defects for wedge subsections W(I) and W(I+2) and a first preselected defect threshold of 5,000. The latter being a comparison of the sum of defects for wedge subsections W(I+1) and W(I+3) and a second preselected defect threshold of 1,000. If the expression is true, then the process has detected (506) a LMS-4 type defect. If the expression is false, then the process determines (508) whether all of the wedge subsections have been counted by examining the expression "I+3=N". If all of the wedge subsections have been counted, then the process notes (510) that no LMS-4 type defects were found. If all of the wedge subsections have not been counted, the process increments (512) the index variable I and returns to determining (504) the sum expression for the next group of wedge subsections.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6:
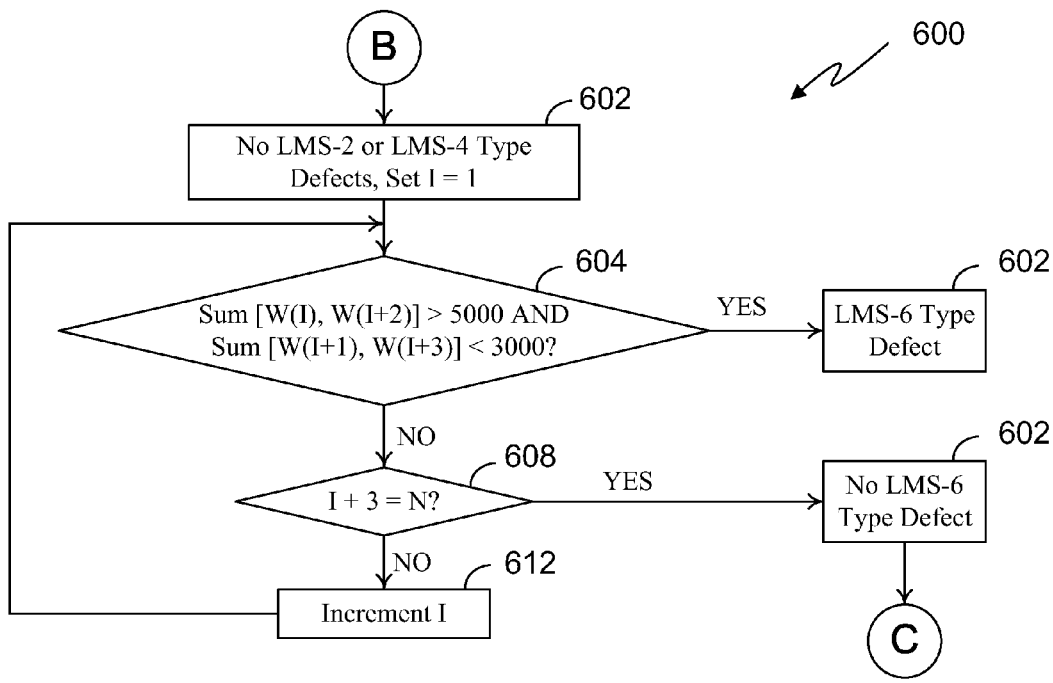
FIG. 6 is a flowchart of a process for determining whether type six light micro scratch (LMS-6) defects exist on a media disk in accordance with one embodiment of the invention.

FIG. 6 is a flowchart of a process 600 for determining whether type six light micro scratch (LMS-6) defects exist on a media disk in accordance with one embodiment of the invention. In particular embodiments, process 600 can be used in conjunction with the media disk of FIG. 4 and/or the processes of FIGS. 1, 3 and 5. Process 600 continues from block 510 of process 500 where it was determined that no LMS-2 and no LMS-4 type defects were found and sets an index variable I to be equal to 1 in block 602.

The process then determines (604) whether the expression "Sum[W(I), W(I+2)]>5,000 AND Sum[W(I+1), W(I+3)] <3000" is true. The former being a comparison of the sum of defects for wedge subsections W(I) and W(I+2) and a first preselected defect threshold of 5,000. The latter being a comparison of the sum of defects for wedge subsections W(I+1) and W(I+3) and a second preselected defect threshold of 3,000. If the expression is true, then the process has detected (606) a LMS-6 type defect. If the expression is false, then the process determines (608) whether all of the wedge subsections have been counted by examining the expression "I+3=N". If all of the wedge subsections have been counted, then the process notes (610) that no LMS-6 type defects were found. If all of the wedge subsections have not been counted, the process increments (612) the index variable I and returns to determining (604) the sum expression for the next group of wedge subsections.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 7:
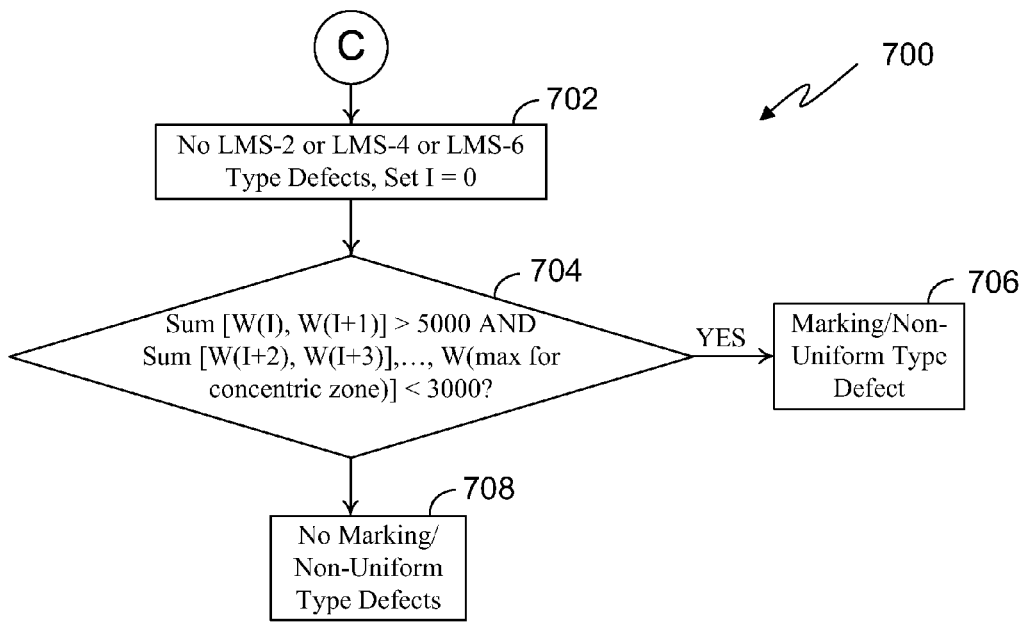
FIG. 7 is a flowchart of a process for determining whether marking/non-uniform type defects exist on a media disk in accordance with one embodiment of the invention.

FIG. 7 is a flowchart of a process 700 for determining whether marking/non-uniform type defects exist on a media disk in accordance with one embodiment of the invention. In particular embodiments, process 700 can be used in conjunction with the media disk of FIG. 4 and/or any the processes discussed above. Process 700 continues from block 610 of process 600 where it was determined that no LMS-2, LMS-4, or LMS-6 type defects were found and sets an index variable I to be equal to 1 in block 702.

The process then determines (704) whether the expression "Sum[W(I), W(I+1)]>5,000 AND Sum[W(I+2), W(I+3), . . . ,W(N)]<3000" is true. The former being a comparison of the sum of defects for wedge subsections W(I) and W(I+1) and a first preselected defect threshold of 5,000. The latter being a comparison of the sum of defects for all wedge subsections except the first two and a second preselected defect threshold of 3,000. If the expression is true, then the process has detected (706) a marking/non-uniform type defect. If the expression is false, then the process notes (708) that no LMS-6 type defects were found.

In another embodiment, the process 700 can continue in order to detect whether a spiral or circular type defect exists. In such case, the process 700 would continue from block 708 where it was determined that no LMS-2, LMS-4, LMS-6, or marking type defects were found and determine whether a new sum expression of "Sum[W(1),W(2),W(3),W(4),W(5), W(6)]>3,000 OR Sum[W(3),W(4),W(5),W(6),W(7),W(8)] >3,000 OR Sum[W(5),W(6),W(7),W(8), W(9)]>3,000" is true. If the new sum expression is true, then the process has detected a spiral or circular type defect (e.g., ring defect). If the expression is false, then the process notes that no spiral/circular type defects were found.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for testing for defects in magnetic media storage disks, the method comprising:
   dividing a surface of a magnetic media disk into a plurality of radial zones;
   dividing the disk surface into a plurality of concentric zones, thereby forming a preselected number (N) of wedge subsections for each of the concentric zones;
   scanning the disk surface for defects;

counting the defects contained within each of the wedge subsections;

summing the defects contained within two or more of the wedge subsections;

comparing the summed defects with a preselected threshold; and determining, based on the comparison, a defect type of the disk.

2. The method of claim 1, wherein the defect type is selected from the group consisting of a non-defect type, a first defect type, a second defect type, a third defect type, and a fourth defect type.

3. The method of claim 2:

wherein the first defect type comprises a LMS-2 defect type, wherein the second defect type comprises a LMS-4 defect type, wherein the third defect type comprises a LMS-6 defect type, and wherein the fourth defect type comprises a non-uniform defect type.

4. The method of claim 1, wherein the summing the defects contained within the two or more wedge subsections comprises:

calculating a sum of the defects in wedge subsection (I) and wedge subsection (I+X), wherein X is a number selected from the group consisting of 1, 2 and 3, and I is a positive integer that ranges from 1 to N.

5. The method of claim 1, wherein the summing the defects contained within the two or more wedge subsections comprises:

(4a) calculating a first sum of the defects in a wedge subsection (I) and a wedge subsection (I+1);

(4b) calculating a second sum of the defects in a wedge subsection (I+2) and a wedge subsection (I+3), wherein I is a positive integer that ranges from 1 to N;

(4c) determining whether the first sum is greater than a preselected first sum threshold;

(4d) determining whether the second sum is less than a preselected second sum threshold;

(4e) classifying, if both conditions (4c) and (4d) are true, the disk as having a first defect type;

repeating, if either condition (4c) is not true or condition (4d) is not true, steps (4a) through (4e) after incrementing I by 1.

6. The method of claim 5, wherein the summing the defects contained within the two or more wedge subsections further comprises:

if the disk does not have the first defect type:

(5a) calculating a third sum of the defects in a wedge subsection (I) and a wedge subsection (I+2);

(5b) calculating a fourth sum of the defects in a wedge subsection (I+1) and a wedge subsection (I+3);

(5c) determining whether the third sum is greater than a preselected third sum threshold;

(5d) determining whether the fourth sum is less than a preselected fourth sum threshold;

(5e) classifying, if both conditions (5c) and (5d) are true, the disk as having a second defect type;

repeating, if either condition (5c) is not true or condition (5d) is not true, steps (5a) through (5e) after incrementing I by 1.

7. The method of claim 6, wherein the summing the defects contained within the two or more wedge subsections further comprises:

if the disk does not have the first defect type and the disk does not have the second defect type:

(6a) calculating a fifth sum of the defects in a wedge subsection (I) and a wedge subsection (I+2);

(6b) calculating a sixth sum of the defects in a wedge subsection (I+1) and a wedge subsection (I+3);

(6c) determining whether the fifth sum is greater than a preselected third sum threshold;

(6d) determining whether the sixth sum is less than a preselected fifth sum threshold;

(6e) classifying, if both conditions (6c) and (6d) are true, the disk as having a third defect type;

repeating, if either condition (6c) is not true or condition (6d) is not true, steps (6a) through (6e) after incrementing I by 1.

8. The method of claim 7, wherein the summing the defects contained within the two or more wedge subsections further comprises:

if the disk does not have the first defect type and the disk does not have the second defect type and the disk does not have the third defect type:

(6a) calculating a seventh sum of the defects in a wedge subsection (I) and a wedge subsection (I+1);

(6b) calculating an eighth sum of the defects in all of the wedge subsections of a selected concentric zone except the wedge subsection (I) and the wedge subsection (I+1);

(6c) determining whether the seventh sum is greater than a preselected seventh sum threshold;

(6d) determining whether the eighth sum is less than a preselected eighth sum threshold;

(6e) classifying, if both conditions (6c) and (6d) are true, the disk as having a fourth defect type;

repeating, if either condition (6c) is not true or condition (6d) is not true, steps (6a) through (6e) after incrementing I by 1.

9. The method of claim 1, wherein N is about equal to 30.

10. The method of claim 1, wherein the concentric zones comprise three concentric zones.

11. The method of claim 10:

wherein the disk surface comprises a plurality of tracks, and wherein the three concentric zones comprise:

a first concentric zone covering about 20 percent of the tracks;

a second concentric zone covering about 50 percent of the tracks; and a third concentric zone covering about 30 percent of the tracks.

12. The method of claim 1, wherein the scanning the disk surface for the defects comprises performing tone scanning on the disk surface.

13. The method of claim 1, wherein the dividing the surface of the magnetic media disk into radial zones comprises dividing the surface of the magnetic media disk into radial zones that have about equal size.

* * * * *